(12) United States Patent
Curtwright

(10) Patent No.: US 10,196,042 B1
(45) Date of Patent: Feb. 5, 2019

(54) WINDSHIELD WIPER ASSEMBLY

(71) Applicant: James W. Curtwright, Champlin, MN (US)

(72) Inventor: James W. Curtwright, Champlin, MN (US)

( * ) Notice: Subject to any disclaimer, the term of this patent is extended or adjusted under 35 U.S.C. 154(b) by 0 days.

(21) Appl. No.: 15/878,054

(22) Filed: Jan. 23, 2018

(51) Int. Cl.
| | |
|---|---|
| *B60S 1/00* | (2006.01) |
| *B60S 1/04* | (2006.01) |
| *B60S 1/06* | (2006.01) |
| *B60S 1/20* | (2006.01) |
| *B60S 1/34* | (2006.01) |
| *B08B 1/00* | (2006.01) |

(52) U.S. Cl.
CPC ............ *B60S 1/0413* (2013.01); *B08B 1/005* (2013.01); *B60S 1/06* (2013.01); *B60S 1/20* (2013.01); *B60S 1/3404* (2013.01); *B60S 1/0491* (2013.01)

(58) Field of Classification Search
CPC .. B60S 1/08; B60S 1/20; B60S 1/3404; B60S 1/0491; B60S 1/06; B08B 1/005
USPC .......................................... 15/250.24, 250.29
See application file for complete search history.

(56) References Cited

U.S. PATENT DOCUMENTS

| | | | | | |
|---|---|---|---|---|---|
| 1,841,734 | A | * | 1/1932 | Hueber | B60S 1/06 15/250.29 |
| 1,886,812 | A | * | 11/1932 | Hueber | B60S 1/10 15/250.29 |
| 3,042,954 | A | * | 7/1962 | Wynn | B60S 1/20 15/250.24 |
| 3,855,661 | A | * | 12/1974 | Prince | B60R 1/0602 15/250.003 |
| 6,100,499 | A | * | 8/2000 | Davila, Sr. | B60Q 1/2684 15/250.04 |
| 6,353,961 | B1 | * | 3/2002 | Lin | B60Q 1/2684 15/250.001 |

FOREIGN PATENT DOCUMENTS

| | | | |
|---|---|---|---|
| EP | 2730470 | * | 5/2014 |
| GB | 226535 | * | 6/1925 |

* cited by examiner

*Primary Examiner* — Gary K. Graham
(74) *Attorney, Agent, or Firm* — Dave Alan Lingbeck

(57) ABSTRACT

A windshield wiper assembly for effectively cleaning all of the windshield from top to bottom and side to side. The windshield wiper assembly includes an elongated housing having an open bottom and adapted to extend a width of a windshield; a wiper actuating assembly securely disposed in the housing; and a wiper assembly movably supported upon the wiper actuating assembly.

1 Claim, 4 Drawing Sheets

WINDSHIELD WIPER ASSEMBLY

BACKGROUND OF THE INVENTION

Field of the Invention

The present invention relates to windshield wipers and more particularly pertains to a new windshield wiper assembly for effectively cleaning all of the windshield from top to bottom and side to side.

Description of the Prior Art

The use of windshield wipers is known in the prior art. More specifically, windshield wipers heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a casing, two master blade holders pivoted to the casing to hold two assistant blade holders and a rubber blade, wherein the casing has a cowling which protects the rubber blade against the radiation of sunlight and gives a downward pressure to the rubber blade against the windshield. Another prior art includes a housing and a blade coupled to the housing and also includes a glass panel with the wiper assembly selectively movable relative to the glass panel. The blade includes a first edge portion disposed along a first side of the blade and a second edge portion disposed along a second side of the blade. While these devices fulfill their respective, particular objectives and requirements, the aforementioned patents do not disclose a new windshield wiper assembly.

SUMMARY OF THE INVENTION

The general purpose of the present invention, which will be described subsequently in greater detail, is to provide a new windshield wiper assembly which has many of the advantages of the windshield wipers mentioned heretofore and many novel features that result in a new windshield wiper assembly which is not anticipated, rendered obvious, suggested, or even implied by any of the prior art windshield wipers, either alone or in any combination thereof. The present invention includes an elongated housing having an open bottom and, adapted to extend a width of a windshield; a wiper actuating assembly securely disposed in the housing; and a wiper assembly movably supported upon the wiper actuating assembly. None of the prior art includes the combination of the elements of the present invention.

There has thus been outlined, rather broadly, the more important features of the windshield wiper assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new windshield wiper assembly which has many of the advantages of the windshield wipers mentioned heretofore and many novel features that result in a new windshield wiper assembly which is not anticipated, rendered obvious, suggested, or even implied by any of the prior art windshield wipers, either alone or in any combination thereof.

Still another object of the present invention is to provide a new windshield wiper assembly for effectively cleaning all of the windshield from top to bottom and side to side.

Still yet another object of the present invention is to provide a new windshield wiper assembly with the blade maintaining constant pressure on the windshield throughout even along the curved areas of the windshield.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
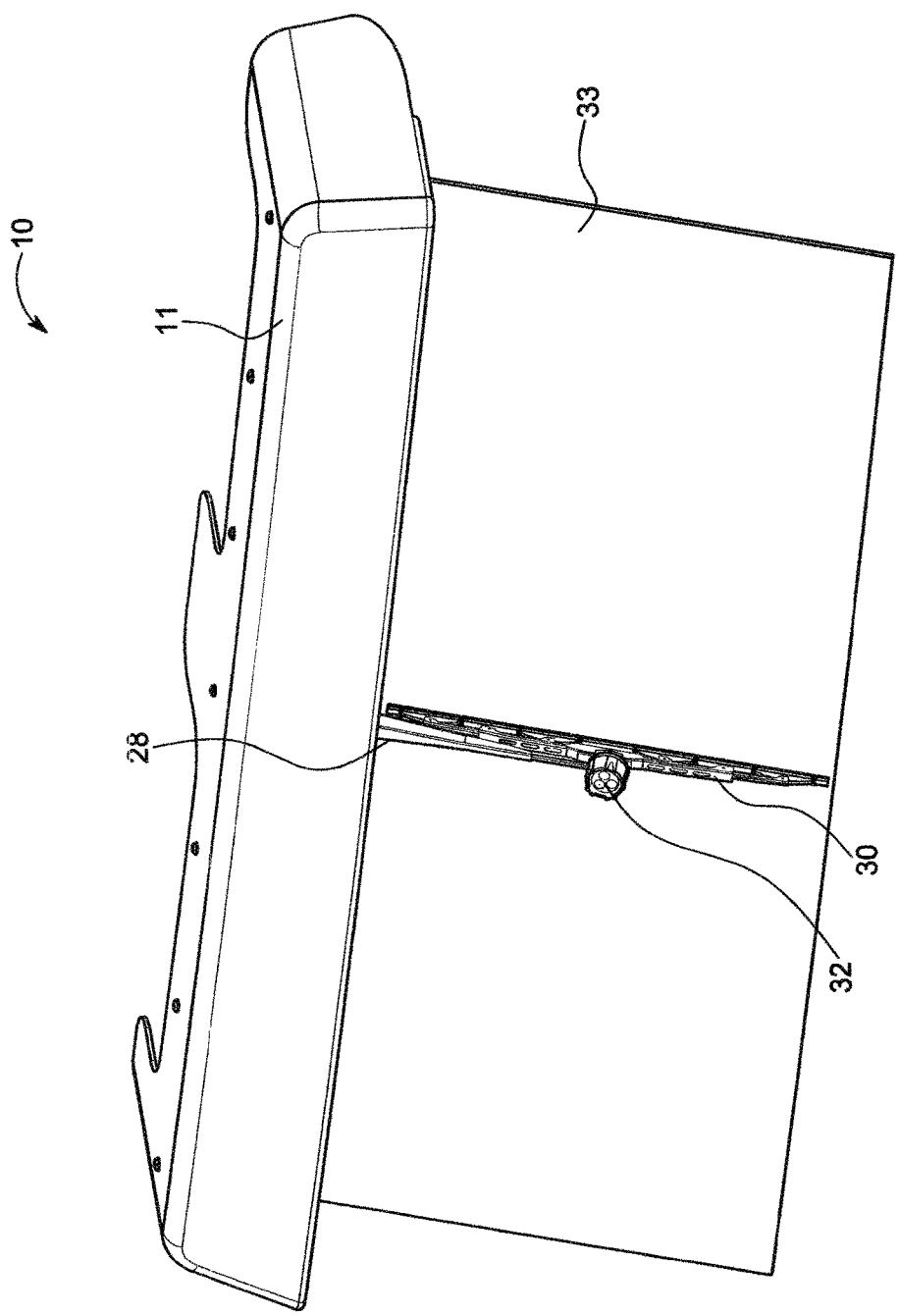
FIG. 1 is a perspective view of a new windshield wiper assembly according to the present invention.
Figure 2:
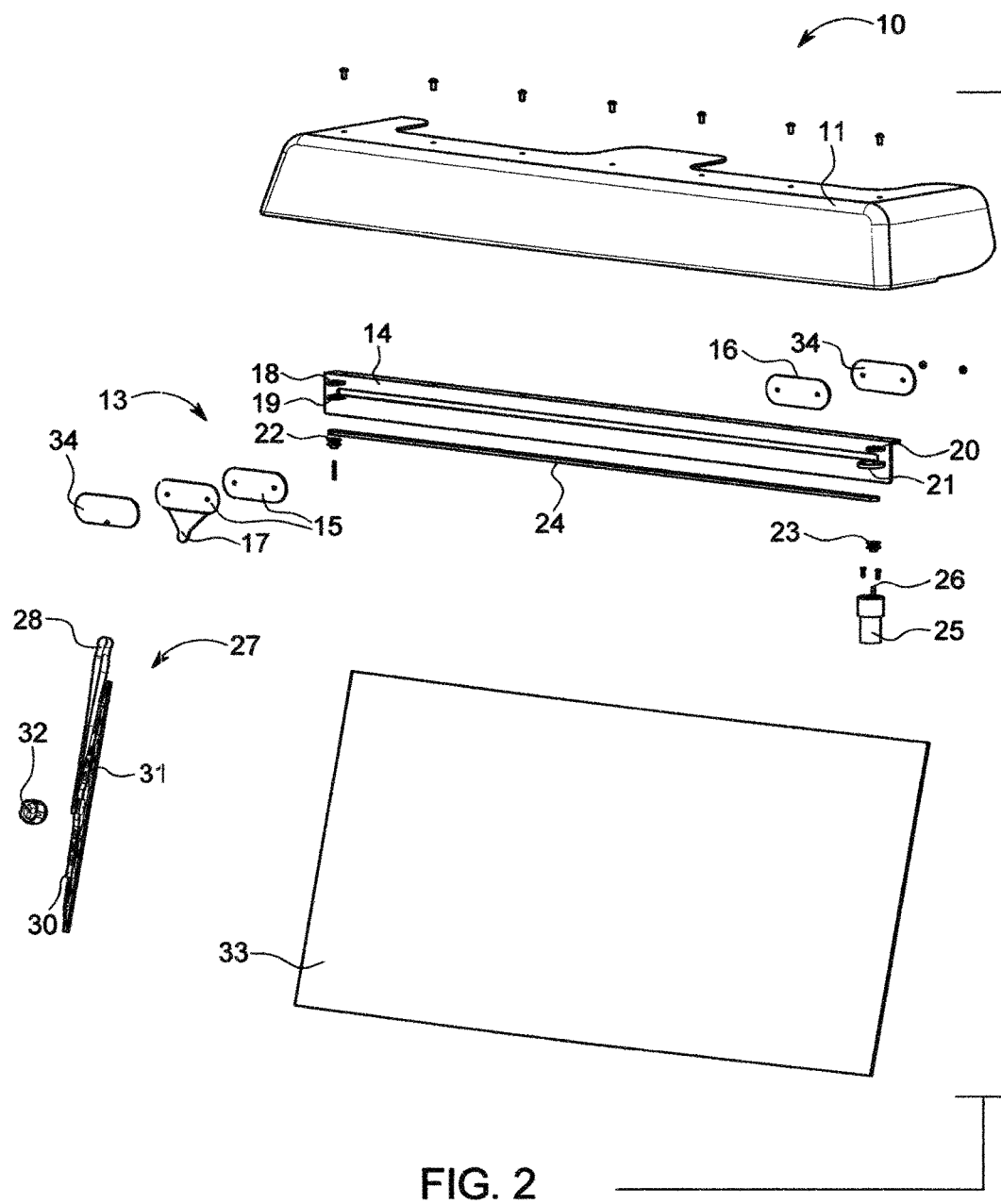
FIG. 2 is an exploded perspective view of the present invention.
Figure 3:
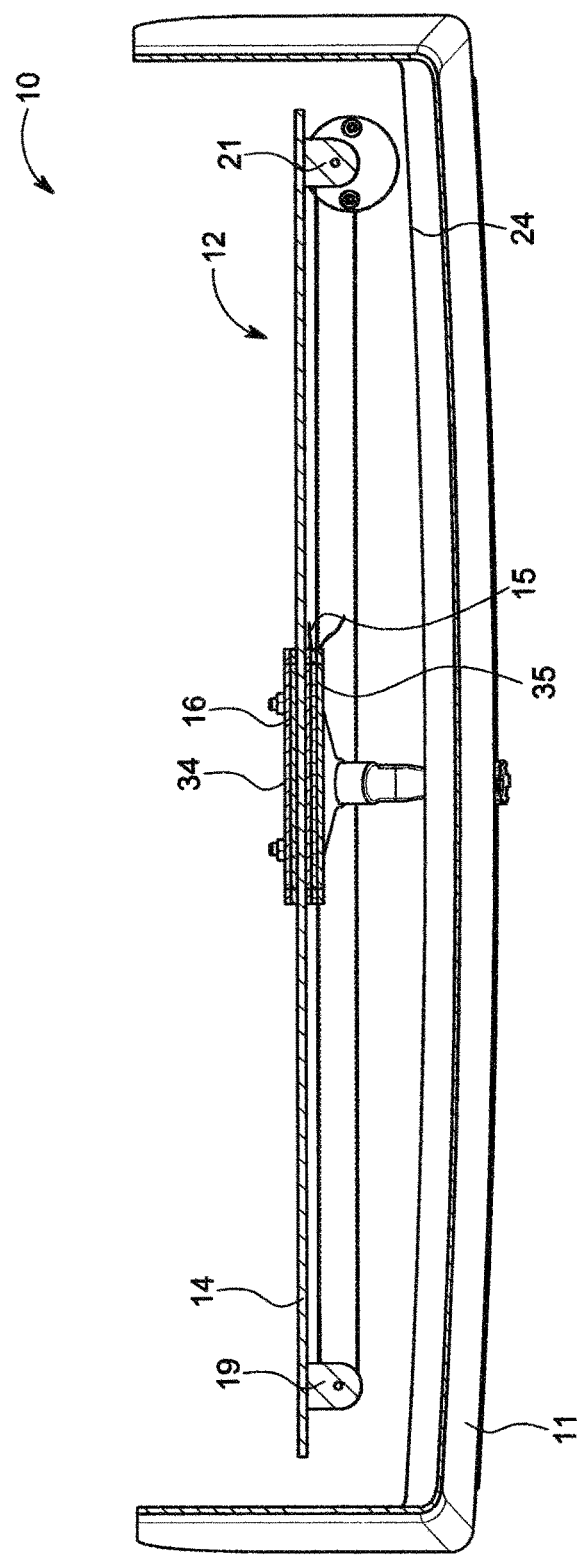
FIG. 3 is a top plan view of the present invention.
Figure 4:
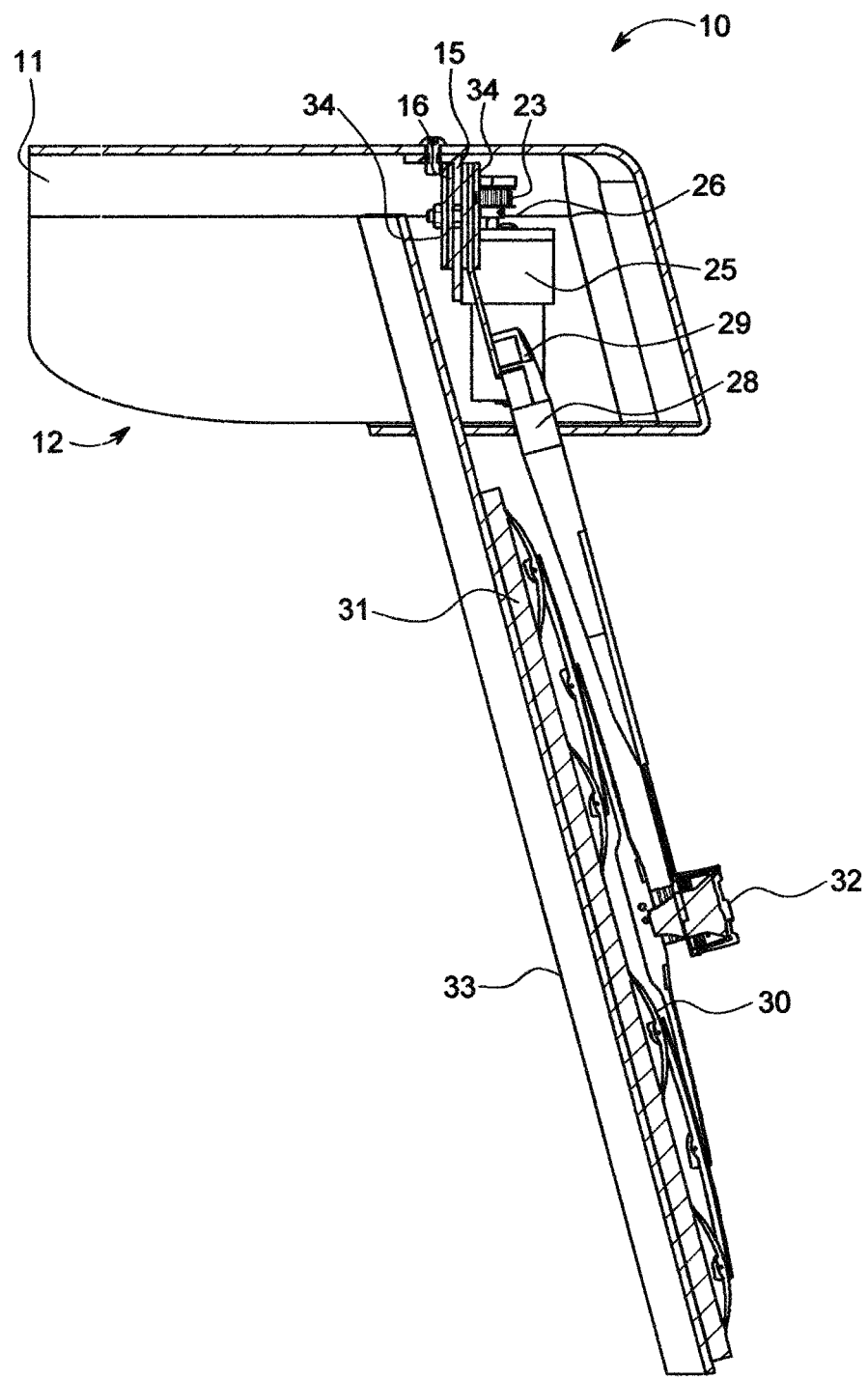
FIG. 4 is an end cross-sectional view of the present invention.

With, reference now to the drawings, and in particular to FIGS. 1 through 4 thereof, a new windshield wiper assembly embodying the principles and concepts of the present invention and generally designated by the reference numeral 10 will be described.

As best illustrated in FIGS. 1 through 4, the windshield wiper assembly 10 generally comprises an elongated housing 11 having an open bottom 12 and adapted to extend a width of a windshield 33; a wiper actuating assembly 13 securely and conventionally disposed in the housing 11; and a wiper assembly 27 movably supported upon the wiper actuating assembly 13.

The wiper actuating assembly 13 includes a rail 14 conventionally disposed in and securely fastened to the housing 11 and extending lengthwise of the housing 11 and also includes wiper support members 15, 16 movably and slidably mounted upon the rail 14. The wiper support members 15, 16 include first wiper support members 15 one of which has an extension 17 integrally depending therefrom and also include a second wiper support member 16 spaced from and conventionally coupled to the first wiper support members 15 with the rail 14 disposed therebetween. The wiper support members 15,16 are planar and are disposed parallel to the rail 14.

The wiper actuating assembly 13 further includes wheel brackets 18,21 conventionally fastened to the rail 14 near opposed ends thereof, and also includes wheels 22,23 rotatably and conventionally supported upon the wheel brackets 18-21 and disposed adjacent to the rail 14. The wiper actuating assembly 13 further includes a flexible line 24 conventionally carried about the wheels 22,23, and also includes flexible line connectors 34 conventionally fastened to the wiper support members 15,16 with at least one of the flexible line connectors 34 conventionally coupled to the flexible line 24 for moving the wiper support members 15,16 upon and along the rail 14. The flexible line connectors 34 are planar and are disposed parallel to the wiper support members 15,16.

The wiper actuating assembly 13 further includes a motor 25 securely and conventionally mounted to one of the wheel brackets 20,21 and having a rotatable shaft 26 with one of the wheels 23 conventionally mounted to the shaft 26 for rotation therewith for moving the wiper support members 15,16 back and forth along the rail 14. Each of the wheel brackets 18-21 includes an upper wheel bracket 18,20 and a lower wheel bracket 19,21 spaced from the upper wheel bracket 18,20. Each of wheels 22,23 is disposed between a respective upper and lower wheel bracket 18-21. Each of the wheels 22,23 has a longitudinal axis which is disposed parallel to the rail 14.

The wiper assembly 27 includes a spring-loaded arm 28 having a proximate end 29 conventionally connected to the extension 17 of the first wiper support members 15 and also includes a wiper bracket 31 conventionally mounted to the spring-loaded arm 28, and further includes a wiper blade 31 conventionally mounted to the wiper bracket 30 and biased against the windshield 33. The wiper assembly 27 further includes a light-emitting member 32 conventionally mounted to the wiper bracket 30 for emitting a light upon the windshield 33.

In use, the motor 25 energizes and rotates the wheels 22,23 moving the flexible line 24 with the wiper support members 15,16 moving with the flexible line 24 upon the rail 14 back and forth upon the windshield 33 and with the wiper blade 31 moving with the wiper support members 15,16 and cleaning all of the windshield 33 even portions of the windshield 33 which are curved.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the windshield wiper assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A windshield wiper assembly comprising:
an elongated housing having an open bottom and adapted to extend a width of a windshield;
a wiper actuating assembly securely disposed in the housing, wherein the wiper actuating assembly includes a rail disposed in and securely fastened to the housing and extending lengthwise of the housing and also includes wiper support members movably and slidably mounted upon the rail, wherein the wiper actuating assembly further includes wheel brackets fastened to the rail near opposed ends thereof, and also includes wheels rotatably supported upon the wheel brackets and disposed adjacent to the rail, wherein the wiper actuating assembly further includes a flexible line carried about the wheels, and also includes flexible line connectors fastened to the wiper support members with at least one of the flexible line connectors coupled to the flexible line for moving the wiper support members upon and along the rail, wherein the flexible line connectors are planar and are disposed parallel to the wiper support members; and
a wiper assembly movably supported upon the wiper actuating assembly.

* * * * *